Feb. 28, 1928.
B. S. AIKMAN
1,660,466
HYDRAULIC BRAKE SYSTEM
Filed March 27, 1925
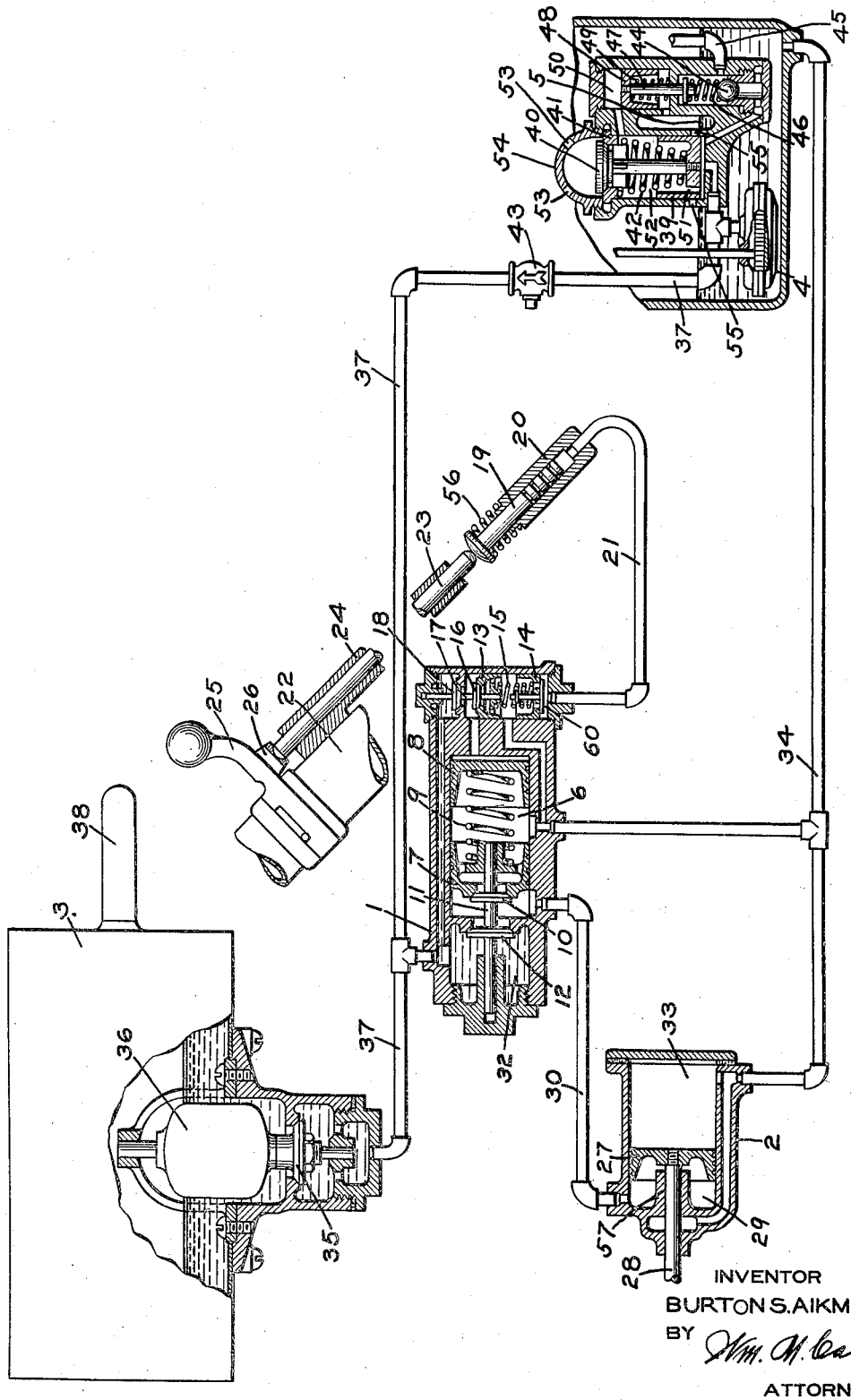
INVENTOR
BURTON S. AIKMAN
BY *Wm. M. Cady*
ATTORNEY Patented Feb. 28, 1928.

1,660,466

UNITED STATES PATENT OFFICE.

BURTON S. AIKMAN, OF MILWAUKEE, WISCONSIN, ASSIGNOR TO THE WESTINGHOUSE AIR BRAKE COMPANY, OF WILMERDING, PENNSYLVANIA, A CORPORATION OF PENNSYLVANIA.

HYDRAULIC BRAKE SYSTEM.

Application filed March 27, 1925. Serial No. 18,707.

This invention relates to fluid pressure brakes, and more particularly to a liquid pressure brake especially adapted for use on motor vehicles.

One object of my invention is to provide a liquid pressure brake apparatus in which the liquid pressure is maintained by fluid under pressure contained in a closed receptacle.

Another object of my invention is to provide a liquid pressure brake system in which the engine lubricating pump is utilized to restore the liquid level and consequently the liquid pressure, after the pressure has been reduced by a brake application.

Another object of my invention is to provide a liquid pressure brake system employing the engine lubricating pump and having means whereby the pump operates at all times to maintain the desired pressure in the engine lubricating system while serving to maintain the pressure in the braking system and without requiring the pump to operate against the higher pressure employed in the brake system, except at times when it is necessary to restore the pressure in the brake system.

Other objects and advantages will appear in the following more detailed description of the invention.

In the accompanying drawing, the single figure is a diagrammatic view, partly in section, of a liquid pressure brake system embodying my invention.

As shown in the drawing, the apparatus may comprise a brake controlling valve device 1, one or more brake cylinders 2, a reservoir 3, containing liquid under pressure, a liquid pump 4, which is preferably the pump which maintains the pressure and flow of lubricating oil in the usual engine lubricating system of a motor vehicle, and a pump and liquid pressure regulating valve device 5.

The brake controlling valve device 1 may comprise a casing having a piston cylinder 6 containing a piston 7 and a piston 8, a pressure regulating spring 9 being interposed between said pistons. The piston 7 is provided with a seat for an exhaust valve 10 and connected by a stem 11 to said valve is a supply valve 12. For controlling the liquid under pressure supplied to the piston 8, a pilot valve mechanism is provided comprising pistons 13 and 14 having an interposed pressure regulating spring 15. The piston 13 is provided with a seat for a pilot exhaust valve 16, and connected by a stem 17 to said valve is a pilot supply valve 18. The liquid under pressure for operating the piston 14 is controlled by a plunger 19 contained in a casing 20 which is connected to piston 14 by a pipe 21. The casing 20 may be located near the steering column 22 of the motor vehicle, and the plunger 19 may be actuated by a rod 23 contained in a casing 24, which is secured to the steering column 22.

Pivotally mounted on the steering column 22 below the usual steering wheel is an operating handle 25 having a cam 26 disposed on the under side, so as to engage the upper end of the rod 23.

The brake cylinder 2 may be of the pull type, and containing brake cylinder piston 27 having a brake operating rod 28. The chamber 29 at the forward end of the brake cylinder is connected by pipe 30 to the supply valve chamber 31 of the brake controlling valve device, and the chamber 33 at the opposite side of the piston is connected by pipe 34 to the oil pan of the motor vehicle engine.

The reservoir 3 is provided with an outlet valve 35 which is controlled by a float 36, the outlet from the reservoir being connected to a pipe 37 which leads to the supply chamber 32 and also to the pump 4. Preferably a pneumatic tire valve (not shown) may be applied to the reservoir and enclosed by the usual cap 38, so that the reservoir may be charged with air pressure and the pressure restored at a tire filling station when desired.

The pump control valve device 5 may comprise a casing having a piston chamber containing a piston 39. Carried by the piston 39 is a valve 40 having a seat in a ring member 41 which is secured in the casing. Interposed between the piston 39 and the ring 41 is a coil spring 42.

The outlet of the engine pump 4 is connected to the pipe 37 which opens into the chamber below the piston 39, a check valve 43 being interposed in the pipe 37 between the pump and the reservoir 3, so as to prevent back flow from the reservoir.

A ball check valve 44 controls communication from the chamber below piston 39 to pipe 45, through which oil is supplied to the lubricating system of the motor vehicle engine, and said check valve is subject to the pressure of a spring 46. Acting on the spring 46 is a plunger 47, which is secured to a piston 48. Said piston is subject on one side to the pressure of a spring 49, and the chamber 50 at the opposite side is connected to the spring chamber of the piston 39.

The reservoir 3 contains oil which is maintained at a certain level by the operation of the float valve 35 and the reservoir is charged with fluid under pressure.

In operation, it will be assumed that the oil level in the reservoir 3 is low enough to allow the float 36 to hold the valve 35 in open position. It will further be assumed that the pressure in the brake system is to be normally maintained at 100 pounds but that the pressure has fallen to 80 pounds, for example.

When the vehicle engine is started under the above conditions of pressure in the brake system, the pump 4 will be operated with the engine to supply oil from the oil pan to the discharge pipe 37, and the pressure in the discharge pipe will rise in proportion to the engine speed. The discharge from the pump 4 flows to the under side of piston 39 and passes through a port 51 to the spring chamber 52 and thence to the chamber above piston 48. As the pressure of the discharge rises, the piston 48 will be forced downwardly, against the resistance of spring 49, compressing the spring 46 through the action of the plunger 47.

When the pressure of oil discharged from the pump exceeds 80 pounds, the assumed pressure above the check valve 43, the check valve will open and the pressure in the pipe 37 above the check valve will be increased and oil will flow past the open check valve 35 into the reservoir 3, so as to raise the level of oil therein. When the pressure has been increased to the predetermined degree which it is desired to carry in the brake system, for example 100 pounds, the level of oil in the reservoir 3 will be such as to cause the float 36 to close the valve 35.

The springs 49 and 46 are so proportioned that the pressure of the spring 46 on the valve 44 will be increased in direct proportion to the increase in pressure in the discharge pipe 37 and will cause the valve 44 to act as a reducing valve to maintain the pressure of oil supplied through pipe 45 to the lubricating system at a predetermined desired degree, for example 25 pounds, regardless of the pressure of oil in the discharge pipe 37.

So long as the valve 40 remains closed, the pressure of oil on opposite sides of the piston 39 remain equalized, since equalization can take place through the port 51, but when the pressure of oil discharged by the pump reaches the predetermined maximum, such as 100 pounds, the spring 42 is such that the valve 40 will open. When the valve 40 opens, due to the pressure of oil acting thereon exceeding the pressure of spring 42, the oil in chamber 52 is free to escape through openings 53 in the cap 54 and drains back into the oil pan of the engine.

The pressure in chamber 52 is thus reduced to atmospheric pressure. While the spring 42 acts on both the valve 40 and the piston 39, the relative areas of the valve 40 and the piston 39 are such that although predetermined maximum pressure of the discharge from the pump, assumed as 100 pounds, is required to open the valve 40, the piston 39 will be maintained in position to hold the valve open, when the pressure below the piston is, for example, 25 pounds.

As the pressure of oil above the piston 39 is quickly reduced, as soon as the valve 40 opens, and since the pressure can no longer be maintained by flow through the port 51, the piston 39 will rapidly move upwardly, so as to uncover the relief ports 55. The piston 39 will adjust itself to a position, such that the uncovered area of the ports 55, together with that of port 51, will permit flow from the discharge side of the pump at a rate which will automatically maintain the pressure of the discharge at the pressure desired for lubrication, which was assumed to be 25 pounds.

With the valve 40 open, the pressure of oil above the piston and on the piston 48 falls to crank case pressure, and as a consequence, the spring 49 will move the piston 48 upwardly, so as to relieve the valve 44 of the pressure of spring 46. The valve 44 then acts merely as a check valve and permits the flow of oil from the discharge of the pump at the lubricating system pressure of 25 pounds.

It will therefore be seen that after the pressure in the reservoir 3 has been restored to the predetermined pressure carried in the brake system, the pump 4 will not be required to work against this pressure, since the check valve 43 prevents back flow and since, as before explained, the pressure in the discharge pipe below the check valve 43 is maintained at 25 pounds.

When an application of the brakes is made, the engine speed will be reduced and also the speed of the pump 4, so that the pump will be unable to maintain the desired pressure of oil for lubricating purposes (25 pounds). The reduction in pressure below 25 pounds will permit the spring 42 to effect the closure of valve 40. with the valve 40 closed, the ports are again in condition to restore the pressure in the brake system, due to the loss of pressure occasioned by the application of the brakes and if the float valve 35 is open, then when the engine is again speeded up, the operation of the parts as just described will be repeated.

It should be noted that in the final closing movement of the valve 40, the movement will be rapid, since a point will be reached where the area of the valve opening at the valve 40 will be less than the area of the port 51, so that the pressure in chamber 52 will build up more rapidly and will thus accelerate the final closing movement of the valve.

Having described how the oil pressure is maintained in the braking system and in the lubricating system of the motor vehicle engine, I will now describe the operation of the brake apparatus.

When it is desired to effect an application of the brakes, the handle or lever 25 is rotated, so as to cause the cam 26 to act on and depress the rod 23 and thereby the plunger 19. The pipe 21 being filled with oil, the downward movement of the plunger 19 causes the oil to be forced against the piston 14, so that said piston will be moved upwardly, depending upon the extent the plunger 19 is depressed.

The spring 15 will then be compressed a corresponding amount, and the pressure of the spring acts on the piston 13, so as to move the same upwardly. This upward movement causes the unseating of the supply valve 18, while the exhaust valve 16 is held seated, and oil under pressure will then flow from the pipe 37, past the valve 18, to the piston 8. The piston 8 is then moved toward the left, so as to compress the spring 9 and the pressure of spring 9 then moves the piston 7 toward the left, so that the valve 12 is unseated, while the valve 10 is held closed. Oil under pressure is then supplied from the reservoir 3 and chamber 32 to the pipe 30 and thence to the brake cylinder 2, causing the movement of the brake cylinder piston 27 toward the right, so as to effect an application of the brakes.

When the pressure of oil supplied past the valve 18 and acting on the upper side of piston 13, slightly exceeds the pressure of spring 15, the piston 13 will be moved downwardly until the valve 18 seats.

The oil thus bottled up and acting on piston 8 determines the position of piston 8 and the extent to which the spring 9 is compressed, and when the pressure of fluid supplied to the brake cylinder and acting on the face of piston 7 slightly exceeds the pressure of the spring 9, the piston 7 will be moved toward the right until the supply valve 12 seats.

If the pressure in the brake cylinder 2 should leak down, while the brakes are applied, the piston 7 will be shifted to the left by the higher pressure of the spring 9, so as to again open the valve 12 and thus supply fluid to the brake cylinder until the pressure has been increased to the predetermined degree for which the spring 9 may be adjusted.

The brakes may be fully released by turning the lever 25 so that pressure exerted by the cam 26 on the rod 23 will be relieved. The plunger 19 is then retracted by the spring 56, so that piston 14 will be relieved of oil pressure, permitting the spring 15 to expand. Piston 13 will then be moved downwardly by the pressure of fluid in the piston chamber of piston 8, and away from the exhaust valve 16, which is held by the seating of valve 18 against further downward movement.

Oil is then exhausted from the piston 8 and drains back to the oil pan through the drain pipe 34.

The piston 8 is then moved toward the right, relieving the pressure on spring 9, so that piston 7 is moved toward the right by brake cylinder pressure, until the valve 10 is unseated.

Oil from the brake cylinder is then exhausted into the chamber 6 and thence drains back to the oil pan of the engine through pipe 34.

The release of the brakes may be graduated off instead of fully releasing same, by making a partial movement of the lever 25, so as to permit a partial upward movement of the plunger 19.

Oil under pressure will then be released from the brake cylinder in accordance with the amount the pressure is reduced on the piston 14 by the upward movement of the plunger 19, as will be evident.

The non-pressure side of the brake cylinder piston 27 and the space outside of the stuffing box 57 of the piston rod 28 are connected to the drain pipe 34, so that any leakage around the piston stem or past the brake cylinder piston 27 will drain back to the oil pan of the engine.

There is a possibility of leakage of liquid from pipe 21 around piston 14 when the liquid in said pipe is under pressure, and if such leakage should occur, then when the plunger 19 moves upwardly, air from the atmosphere may leak past the plunger to the pipe 21. Air in the pipe 21 will interfere with the desired action of the plunger 19, in that in such case a given movement of the plunger 19 will result in a lower pressure transmitted to the piston 14 than would be the case were the pipe 21 entirely filled with liquid.

In order to avoid this difficulty, a check valve 60 is provided in the piston 14 which permits flow of liquid from the chamber above the piston 14 to pipe 21 in case there is a loss of liquid from said pipe by leakage, so that the pipe 21 is always maintained full of liquid, and air is prevented from entering the pipe, past the plunger 19.

Having now described my invention, what

I claim as new and desire to secure by Letters Patent, is:—

1. In a liquid pressure brake, the combination with a receptacle containing liquid under pressure and means for supplying liquid from said receptacle for controlling the brakes, of a liquid pump for supplying liquid for lubricating the engine of a motor vehicle and also to said receptacle and means for limiting the pressure of liquid supplied to said receptacle to a predetermined maximum degree.

2. The combination with a liquid pump for supplying liquid for lubricating the engine of a motor vehicle, of a receptacle containing a body of liquid subject to fluid under pressure and having a connection to said pump, whereby the level of liquid in said receptacle is maintained by liquid supplied from the pump.

3. The combination with a liquid pump for supplying liquid for lubricating the engine of a motor vehicle, of a receptacle containing a body of liquid subject to fluid under pressure and having a connection through which liquid is supplied by said pump to said receptacle, and a valve device operated according to the level of liquid in said receptacle for controlling communication from the pump to said receptacle.

4. The combination with a liquid pump for supplying liquid for lubricating the engine of a motor vehicle, of a receptacle containing a body of liquid subject to fluid under pressure and having a connection through which liquid is supplied by said pump to said receptacle, a valve for controlling communication from said pump to said receptacle, and a float controlled according to the level of liquid in said receptacle for controlling the operation of said valve.

5. The combination with a receptacle containing liquid under pressure and a pump for supplying liquid to the lubricating system of a motor vehicle engine and to said receptacle, of means for limiting the pressure of liquid supplied to the lubricating system to a predetermined degree.

6. The combination with a receptacle containing liquid under pressure and a pump for supplying liquid to the lubricating system of a motor vehicle engine and to said receptacle, of means for limiting the pressure of liquid supplied to the lubricating system to one degree and the pressure of liquid supplied to said receptacle to another degree.

7. The combination with a receptacle containing liquid under pressure and a pump for supplying liquid to the lubricating system of a motor vehicle engine and to said receptacle, of means for limiting the pressure of liquid supplied to said receptacle to one degree and for limiting the pressure of fluid supplied to the lubricating system to a degree less than that supplied to the receptacle.

8. The combination with a receptacle containing liquid under pressure and a pump for supplying liquid to the lubricating system of a motor vehicle engine and to said receptacle, of a valve for controlling the supply of liquid under pressure to the lubricating system, and means for loading said valve as the pressure of liquid supplied by the pump increases to limit the pressure of liquid supplied to the lubricating system to a predetermined degree.

9. The combination with a receptacle containing liquid under pressure and a pump having its discharge connected to said receptacle and to the lubricating system of a motor vehicle engine, of a valve for controlling communication from the pump discharge to the lubricating system, a spring acting on said valve, and a piston subject to the pressure of liquid discharged by the pump for compressing said spring.

10. The combination with a receptacle containing liquid under pressure and a pump for supplying liquid under pressure to said receptacle, of a valve operated upon a predetermined increase in the pressure of liquid discharged by the pump for relieving the pressure of liquid discharged.

11. The combination with a receptacle containing liquid under pressure and a pump for supplying liquid under pressure to said receptacle, of a valve subject to the opposing pressures of the liquid discharged by the pump and a spring and operated upon a predetermined increase in the pressure of the liquid for relieving the pressure of the liquid discharged.

12. The combination with a receptacle containing liquid under pressure and a pump for supplying liquid under pressure to said receptacle, of a valve subject to the opposing pressures of the liquid discharged by the pump and a spring and operated upon a predetermined increase in the pressure of the liquid for relieving the pressure of the liquid discharged, and a piston subject to the opposing pressures of the liquid discharged by the pump and a spring for maintaining said valve in its open position.

13. The combination with a liquid pump, of a valve subject to the opposing pressures of the liquid discharged by the pump and a spring and operated upon a predetermined increase in the pressure of liquid discharged for opening said valve to relieve the pressure of liquid discharged, and a piston associated with said valve and subject on one side to the pressure of liquid discharged and having means for equalizing the liquid pressures on opposite sides of the piston when said valve is closed.

14. The combination with a liquid pump, of a valve operated upon a predetermined increase in the pressure of liquid discharged by the pump for relieving the pressure of the liquid discharged, and a piston subject to the pressure of liquid discharged from the pump for also operating said valve.

15. The combination with a liquid pump, of a valve operated upon a predetermined increase in the pressure of liquid discharged by the pump for relieving the pressure of the liquid discharged, and a piston subject to the pressure of liquid discharged from the pump for also operating said valve, said piston controlling a relief port in its movement through which liquid discharged from the pump can escape.

16. The combination with a receptacle containing liquid under pressure and a pump for supplying liquid under pressure to said receptacle and to the lubricating system of a motor vehicle engine, of means for limiting the pressure of liquid supplied to the lubricating system to a predetermined degree, and means operating at a predetermined increase in the pressure of liquid discharged by the pump for relieving the pressure of the discharged liquid.

17. In a liquid pressure brake, the combination with a brake cylinder, of a valve for controlling the supply of liquid under pressure to said brake cylinder, a piston subject to the opposing pressures of the brake cylinder and a spring for operating said valve, a piston operated by liquid under pressure for compressing said spring, and means for supplying liquid under pressure to said last mentioned piston.

18. In a liquid pressure brake, the combination with a brake cylinder, of means for controlling the supply of liquid under pressure to said brake cylinder, a main piston operated by liquid under pressure for effecting the operation of said means, and a pilot valve device for controlling the liquid under pressure on said piston.

19. In a liquid pressure brake, the combination with a brake cylinder, of means for controlling the supply of liquid under pressure to said brake cylinder, a main piston operated by liquid under pressure for effecting the operation of said means, a pilot valve for controlling the supply of liquid under pressure to said piston, a piston subject to the opposing pressures of a spring and the pressure of fluid supplied to said main piston, and a piston operated by liquid under pressure for compressing said spring.

20. In a liquid pressure brake, the combination with a brake cylinder, of a valve for supplying liquid under pressure to said brake cylinder, a valve for releasing liquid from said brake cylinder, a piston subject to the opposing pressures of the brake cylinder and a spring for operating said valves, a piston operated by liquid under pressure for compressing said spring, and means for controlling the liquid under pressure on said last mentioned piston.

21. In a liquid pressure brake, the combination with a brake cylinder, of a main valve mechanism operated by variations in liquid under pressure for controlling the admission and exhaust of liquid under pressure to and from the brake cylinder, a pilot valve for controlling the supply of liquid under pressure to said valve mechanism, a pilot valve for controlling the exhaust from said valve mechanism, a piston subject to the pressure of a spring for operating said valves, and a piston operated by liquid under pressure for compressing said spring.

22. In a liquid pressure brake, the combination with means for controlling the supply of liquid under pressure to apply the brakes and including a piston, of a movable member connected to said piston by a liquid column, and means for maintaining the liquid in said column against leakage.

23. In a liquid pressure brake, the combination with means for controlling the supply of liquid under pressure to apply the brakes and including a piston, of a movable member connected to said piston by a liquid column, and a check valve in said piston for permitting the flow of liquid to said column to compensate for loss due to leakage.

In testimony whereof I have hereunto set my hand.

BURTON S. AIKMAN.